US012691662B2

(12) United States Patent
Hiwatashi et al.

(10) Patent No.: US 12,691,662 B2
(45) Date of Patent: Jul. 28, 2026

(54) PACKAGING BODY AND METHOD FOR PRODUCING SAME

(71) Applicant: Kao Corporation, Tokyo (JP)

(72) Inventors: Masaki Hiwatashi, Utsunomiya (JP); Hotaka Takakuwa, Tokyo (JP)

(73) Assignee: KAO CORPORATION, Tokyo (JP)

( * ) Notice: Subject to any disclaimer, the term of this patent is extended or adjusted under 35 U.S.C. 154(b) by 664 days.

(21) Appl. No.: 18/028,780

(22) PCT Filed: Dec. 15, 2021

(86) PCT No.: PCT/JP2021/046179
§ 371 (c)(1),
(2) Date: Mar. 28, 2023

(87) PCT Pub. No.: WO2022/131281
PCT Pub. Date: Jun. 23, 2022

(65) Prior Publication Data
US 2023/0330967 A1      Oct. 19, 2023

(30) Foreign Application Priority Data

Dec. 17, 2020    (JP) ................................. 2020-209221
Nov. 8, 2021    (JP) ................................. 2021-182159

(51) Int. Cl.
B32B 5/26          (2006.01)
B32B 5/02          (2006.01)
(Continued)

(52) U.S. Cl.
CPC .............. B32B 5/271 (2021.05); B32B 5/022 (2013.01); B32B 37/0053 (2013.01);
(Continued)

(58) Field of Classification Search
None
See application file for complete search history.

(56) References Cited

U.S. PATENT DOCUMENTS 6,258,196 B1    7/2001  Suzuki et al.
6,372,068 B1    4/2002  Kincel et al.
(Continued)

FOREIGN PATENT DOCUMENTS

CN          102257199 A      11/2011
CN          102482816 A       5/2012
(Continued)

OTHER PUBLICATIONS

International Search Report and Written Opinion mailed on Feb. 22, 2022, received for PCT Application PCT/JP2021/046179, filed on Dec. 15, 2021, 14 pages including English Translation.

*Primary Examiner* — Yan Lan
(74) *Attorney, Agent, or Firm* — XSENSUS LLP

(57) ABSTRACT

A package (1) includes a bag (20) and a sheet laminate (10) packaged in the bag (20). The sheet laminate (10) includes a first fiber sheet (11) including a first fiber including a PET resin having a melting point higher than 230° C., and a second sheet (12) including a thermoplastic resin having a melting point of 230° C. or lower. The sheet laminate (10) includes a joined portion (30) in which the first fiber sheet (11) and the second sheet (12) are joined adjacently to each other. In the joined portion (30), constituent resin of the first fiber sheet (11) is embedded in the thermoplastic resin constituting the second sheet (12). The present invention also provides a production method of the package.

12 Claims, 5 Drawing Sheets

(51) Int. Cl.

| | | |
|---|---|---|
| *B32B 37/00* | (2006.01) | |
| *B65B 5/04* | (2006.01) | |
| *B65D 75/26* | (2006.01) | |

(52) U.S. Cl.

CPC .............. *B65B 5/045* (2013.01); *B65D 75/26* (2013.01); *B32B 2260/021* (2013.01); *B32B 2260/046* (2013.01); *B32B 2262/0253* (2013.01); *B32B 2262/0284* (2013.01); *B32B 2305/18* (2013.01); *B32B 2307/748* (2013.01); *B32B 2309/12* (2013.01); *B32B 2555/02* (2013.01)

(56) References Cited

U.S. PATENT DOCUMENTS

| | | | |
|---|---|---|---|
| 7,947,347 B2 * | 5/2011 | Takashima ............ | F16L 59/065 |
| | | | 428/36.1 |
| 2004/0035410 A1 * | 2/2004 | Igaki ........................ | A61F 9/04 |
| | | | 126/263.05 |
| 2004/0077248 A1 | 4/2004 | Kurahashi et al. | |
| 2004/0142151 A1 | 7/2004 | Toyoshima et al. | |
| 2005/0227565 A1 | 10/2005 | Peruzzo | |
| 2011/0223388 A1 | 9/2011 | Stone et al. | |

| | | | |
|---|---|---|---|
| 2012/0226250 A1 | 9/2012 | Sato et al. | |
| 2015/0173975 A1 | 6/2015 | Harumoto et al. | |
| 2016/0074243 A1 | 3/2016 | Rosati et al. | |

FOREIGN PATENT DOCUMENTS

| | | |
|---|---|---|
| CN | 103993428 A | 8/2014 |
| CN | 111432768 A | 7/2020 |
| JP | 05-287682 A | 11/1993 |
| JP | 9-076388 A | 3/1997 |
| JP | 10-234768 A | 9/1998 |
| JP | 11-151785 A | 6/1999 |
| JP | 11-350322 A | 12/1999 |
| JP | 2004-166849 A | 6/2004 |
| JP | 2006-002303 A | 1/2006 |
| JP | 2006-334906 A | 12/2006 |
| JP | 2007-307729 A | 11/2007 |
| JP | 2012-143543 A | 8/2012 |
| JP | 2015-165061 A | 9/2015 |
| JP | 2015-171649 A | 10/2015 |
| JP | 2016-203580 A | 12/2016 |
| JP | 2017-533350 A | 11/2017 |
| JP | 2019-509921 A | 4/2019 |
| JP | 2020-32605 A | 3/2020 |
| TW | 201631240 A | 9/2016 |

* cited by examiner

11a

PACKAGING BODY AND METHOD FOR PRODUCING SAME

CROSS-REFERENCE TO RELATED APPLICATIONS

The present application is a 371 of PCT filing PCT/JP2021/046179, filed Dec. 15, 2021, and claims priority from Japanese Patent Application No. 2020-209221 filed on Dec. 17, 2020, and Japanese Patent Application No. 2021-182159 filed on Nov. 8, 2021, the entire contents of each are incorporated herein by reference.

TECHNICAL FIELD

The present invention relates to a package and a production method thereof.

BACKGROUND ART

A sheet laminate in which a plurality of sheet materials are laminated is used in various applications. Patent Literature 1 discloses a laminated sheet in which synthetic fiber sheets having different melt start temperatures are intermittently fusion-bonded and integrated. Further, Patent Literature 2 discloses a laminated sheet in which a nonwoven fabric layer having a resin penetration rate of 40% or less and a thermoplastic resin layer are laminated, and adhesive strength is 10 g/25 mm or more.

Patent Literature 3 discloses a laminated sheet including a sheet member in which nonwoven fabrics formed of polyethylene terephthalate fibers are laminated on both surfaces of a breathable waterproof sheet, and a fusion bond film containing a low-melting-point substance. Further, Patent Literature 4 discloses an ultrasonic welding device for producing a floor material by joining a plurality of objects to be welded that are formed of different types of materials by ultrasonic vibration.

CITATION LIST

Patent Literature

Patent Literature 1: JPH05-287682A
Patent Literature 2: JPH11-151785A
Patent Literature 3: JP2016-203580A
Patent Literature 4: WO2019-509921A

SUMMARY OF INVENTION

However, in the laminated sheets described in Patent Literatures 1 to 3, joining strength is insufficient when a specific resin is used as the constituent materials. Further, when the laminated sheet described in each of the Patent Literatures is provided as a package in which the laminated sheet is packaged, nothing is considered concerning bulkiness of the laminated sheet after opening.

The art described in Patent Literature 4 relates to the floor material, and nothing is considered concerning the laminated sheet containing fibers.

The present invention relates to a package having a sheet laminate having sufficient joining strength, with bulkiness easily restored after opening.

The present invention relates to a package having a bag, and a sheet laminate packaged in the bag.

In one embodiment, the sheet laminate preferably includes: a first fiber sheet including a first fiber including a constituent resin which contains a polyethylene terephthalate resin having a melting point higher than 230° C.; and a second sheet including a thermoplastic resin having a melting point of 230° C. or lower.

In one embodiment, the sheet laminate preferably includes a joined portion in which the first fiber sheet and the second sheet are joined adjacently to each other.

In one embodiment, in the joined portion, the constituent resin of the first fiber sheet is preferably embedded in the thermoplastic resin constituting the second sheet.

Further, the present invention relates to a method for producing a package in which a sheet laminate is packaged in a bag.

In one embodiment, a first fiber sheet including a fiber including a polyethylene terephthalate resin having a melting point higher than 230° C., and a second sheet including a thermoplastic resin having a melting point of 230° C. or lower are preferably overlaid on each other so as to form an adjacent site where the first fiber sheet and the second sheet are adjacent to each other.

In one embodiment, the first fiber sheet and the second sheet are preferably joined by pressing the adjacent site while heating the adjacent site, in a state in which the first fiber sheet and the second sheet are overlaid on each other.

The other features of the present invention will become apparent from the claims and the following explanation.

DESCRIPTION OF EMBODIMENTS

When the upper limit value or the lower limit value, or the upper and lower limit values of a numerical value are defined in the present specification, values of the upper limit value and the lower limit value themselves are also included. Further, it should be understood that all numerical values or numerical value ranges that are equal to or less than the upper limit value or are equal to or more than the lower limit value or in the range of the upper and lower limit values are described even if it is not stated clearly.

In the present specification, "a", "an" and the like are interpreted to mean "equal to or more than one".

In the light of the aforementioned disclosure and the following disclosure in the present specification, it is understandable that various modified modes and altered modes of the present invention are possible. Accordingly, it should be understood that in the technical scope based on the description of the claims, the present invention can be carried out with respect to embodiments that are not clearly described in the present specification.

The entire contents described in the aforementioned Patent Literatures are incorporated in the present specification as a part of the content of the present specification.

This application claims the benefit of priority based on Japanese Patent Application No. 2020-209221 filed on Dec. 17, 2020, and Japanese Patent Application No. 2021-182159 filed on Nov. 8, 2021, and the entire contents of Japanese Patent Application No. 2020-209221 and Japanese Patent Application No. 2021-182159 are incorporated as a part of the present specification.

Hereinafter, the present invention will be described based on preferable embodiments thereof with reference to the drawings.

A package of the present invention has a bag and a sheet laminate packaged in the bag.

Figure 1:
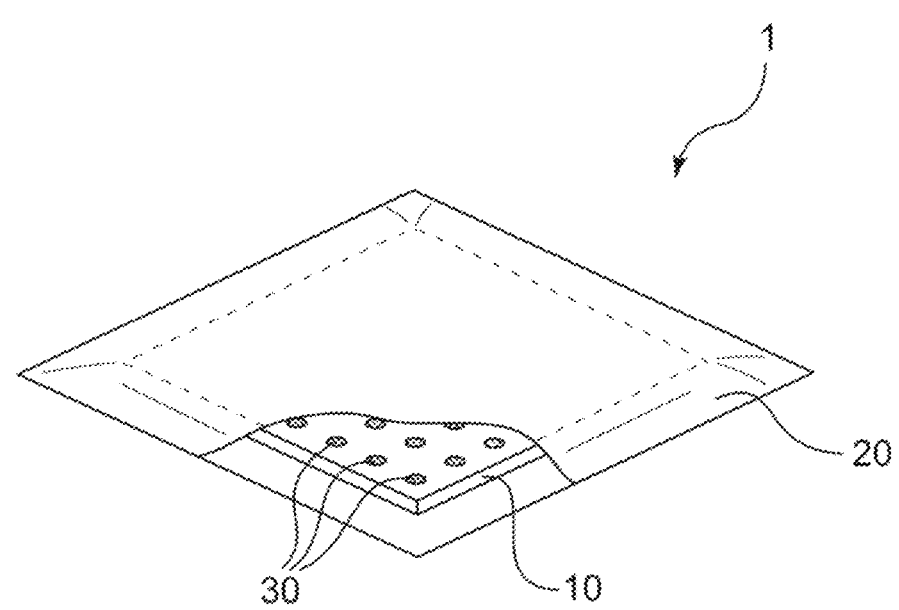
FIG. 1 is a perspective view schematically showing a package of the present invention.

One embodiment of the package is shown in FIG. 1.

A package 1 shown in FIG. 1 has a sheet laminate 10, and a bag 20 for packaging the sheet laminate 10.

The sheet laminate 10 is a laminate of sheet materials including at least a first fiber sheet, and a second sheet as described later.

Details of the bag 20 will be described later.

One embodiment of a configuration of the sheet laminate 10 will be described hereinafter.

The sheet laminate 10 preferably includes at least the first fiber sheet and the second sheet.

The sheet laminate 10 preferably has a joined portion where the first fiber sheet and the second sheet are joined adjacently to each other.

The sheet laminate 10 preferably includes a first surface constituting an outer surface thereof, and a second surface constituting an outer surface located on an opposite side of the first surface.

Figure 2:
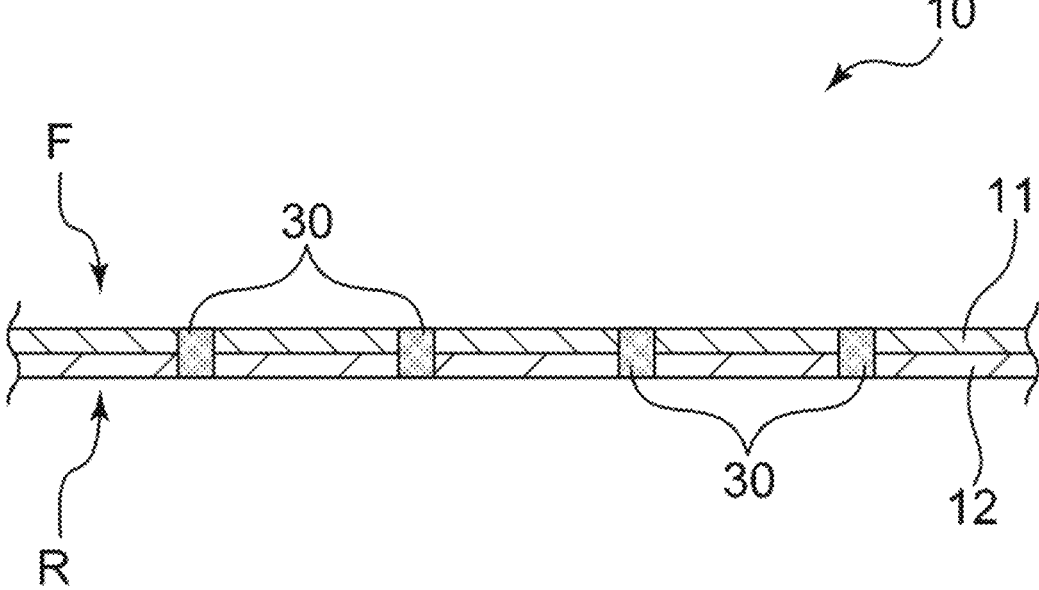
FIG. 2 is a sectional view schematically showing a section of a sheet laminate included in the package of the present invention.

One embodiment in a sectional view in a thickness direction of the sheet laminate 10 is shown in FIG. 2.

The sheet laminate 10 shown in FIG. 2 is a sheet having a multiple-layer structure in which a first fiber sheet 11 and a second sheet 12 provided on one surface side of the first fiber sheet 11 are integrated.

In the embodiment shown in FIG. 2, a sheet laminate has a two-layer structure in which the respective sheets 11 and 12 are arranged adjacently to each other.

In the present embodiment, the first fiber sheet 11 includes a first surface F, and the second sheet 12 includes a second surface R.

The second sheet 12 may be arranged on an entire region on one surface side of the first fiber sheet 11, or may be arranged on only a part of the surface.

In the sheet laminate 10 in the present embodiment, joined portions 30 where the first fiber sheet 11 and the adjacent second sheet 12 are joined to each other are formed.

In the present embodiment, other constituent members do not exist between the sheets 11 and 12, and on respective outer surfaces of the respective sheets 11 and 12, but other constituent members are not prevented from being placed between the sheets 11 and 12, and the respective outer surfaces of the respective sheets 11 and 12.

The other constituent members that can constitute the sheet laminate 10 will be described later.

The first fiber sheet 11 preferably includes a first fiber including a polyethylene terephthalate (PET) resin. In other words, the first fiber sheet 11 is a fiber aggregate including the first fiber.

The fiber containing a PET resin typically has high rigidity, so that even when the sheet laminate 10 is compressed in a sheet thickness direction in a process of packaging and distribution, bulkiness of the sheet laminate 10 is easily restored and the sheet laminate 10 is made good to the touch when the bag is opened and the compressed state is released, by using the first fiber sheet 11 containing a PET resin as one constituent member of the sheet laminate 10.

From a viewpoint of preventing compression by other constituent members constituting the sheet laminate 10, and easily restoring the bulkiness of the sheet laminate 10 to make the sheet laminate even better to the touch, the first fiber sheet 11 is more preferably arranged to constitute an outer surface of the sheet laminate 10, in the sheet laminate 10. In other words, the first fiber sheet 11 more preferably constitutes a first surface F or a second surface R of the sheet laminate 10.

From a viewpoint of making it easier to restore the bulkiness of the sheet laminate, a melting point of the PET resin included in the first fiber sheet 11 is preferably higher than 230° C.

From a viewpoint of handleability of the sheet, the melting point of the PET resin included in the first fiber sheet 11 is preferably 300° C. or lower.

In order to make the melting point of the PET resin higher than 230° C., a polymer having a site in which ethylene and terephthalic acid are not copolymerized in a chemical structure can be used, as a polymerization form thereof.

The second sheet 12 preferably includes a thermoplastic resin having a predetermined melting point. Even when the PET resin is included as constituent fibers of the first fiber sheet 11, it is possible to join the sheets 11 and 12 firmly while maintaining a shape of the fiber by using the second sheet 12 including the thermoplastic resin having the predetermined melting point as one constituent member of the sheet laminate 10. As a result, joining strength between the sheets can be enhanced.

From a viewpoint of successfully embedding the constituent resin of the first fiber in the constituent resin of the second sheet, a melting point of the thermoplastic resin included in the second sheet 12 is preferably 230° C. or lower, more preferably 200° C. or lower, and even more preferably 180° C. or lower.

From a viewpoint of handleability of the sheet, the melting point of the thermoplastic resin included in the second sheet 12 is preferably 70° C. or higher, more preferably 80° C. or higher, and even more preferably 90° C. or higher.

A melting point of the resin constituting each of the sheets 11 and 12 refers to an endothermic peak caused by a phase change from a solid to a liquid before the resin is thermally decomposed when the resin to be measured is heated.

Specifically, the melting point of a resin is a temperature at which the melting peak is observed in differential scanning calorimetry (DSC), and means a temperature with the largest endothermic peak when a plurality of peaks are observed.

When the melting point cannot be clearly measured by the aforementioned method, a softening point is used instead of the melting point.

Examples of the thermoplastic resin that can be included in the second sheet 12 include a polyolefin resin, polyester resin, polyamide resin, vinyl resin, acrylic resin, fluororesin and the like, provided that the melting point of the resin is 230° C. or lower.

Examples of the polyolefin resin include a polyethylene (PE), polypropylene (PP), ethylene-α-olefin copolymer, ethylene-propylene copolymer and the like.

Examples of the polyester resin include a PET, polybutylene terephthalate, polylactic acid resin and the like.

Examples of the polylactic acid resin include a polylactic acid, lactic acid-hydroxycarboxylic acid copolymer and the like.

Examples of the vinyl resin include a polyvinyl chloride, polyvinylidene chloride, polystyrene and the like.

Examples of the acrylic resin include a polyacrylic acid, polyacrylic ester, polymethacrylic acid, polymethacrylic acid ester and the like.

Examples of the fluororesin include a polyperfluoroethylene and the like.

These resins can be used alone or in combination of two or more.

Of these resins, by using a polyolefin resin, it is possible to produce a sheet laminate that is easy to process into a sheet of a nonwoven fabric, film or the like, and is gentle on a skin.

Note that the second sheet 12 can contain at least a thermoplastic resin having a melting point of 230° C. or lower, and, for example, a PET resin having a melting point of higher than 230° C. is not prevented from being further included in the second sheet.

The sheet laminate 10 preferably has a joined portion 30 in which the first fiber sheet 11 and the second sheet 12 are joined adjacently to each other, as shown in FIG. 1 and FIG. 2.

The joined portion 30 is formed by crimping, bonding or fusion-bonding the sheets together. From a viewpoint of achieving both flexibility and strength of the sheet and further enhancing usability, the joined portion 30 is preferably formed by fusion bond.

In the joined portion 30, a boundary surface of each of the sheets 11 and 12 does not exist, or the boundary surface is unclear.

A formation site of the joined portion 30 in the sheet laminate 10 may be depressed in a thickness direction or may be flat.

A formation mode such as a shape in plan view and the number of formations of the joined portion 30 can be appropriately changed depending on the use of the sheet laminate, but typically, in the plan view of the sheet laminate 10, one or two or more of the joined portion 30 are formed in a linear shape or in a dotted pattern, or in a pattern of a combination thereof.

When the joined portion 30 is formed in a linear shape, it may be formed in a shape of a continuous line or a discontinuous line, or in a shape of a straight line or a curved line. Further, a line width may be uniform, or may vary. These shapes can be used alone or in combination of a plurality of shapes.

When the joined portions 30 are formed in a dotted pattern, a shape in plan view of the joined portion 30 may be a circular shape such as a perfect circle and an oval, a polygonal shape such as a rectangle and a hexagon, an alphabetic shape such as an X-shape, and Y-shape, a lattice shape, or a combination of these shapes.

The embodiment shown in FIG. 1 has a mode in which the joined portions 30 are formed in a dotted pattern in plan view of the sheet laminate 10, for convenience of explanation, but the formation mode of the joined portions 30 is not limited to the dotted pattern, and arbitrary forms and a combination thereof can be adopted, as described above.

From the viewpoint of successfully embedding the constituent resin of the first fiber into the constituent resin of the second sheet, the first fiber sheet 11 and the second sheet 12 are preferably joined adjacently to each other in the joined portion 30. In other words, it is preferable that there are no other constituent members between the first fiber sheet 11 and the second sheet 12 in the formation position of the joined portion 30.

Another constituent member may exist between the first fiber sheet 11 and the second sheet 12 to give a desired function to the sheet laminate, in a site other than the formation site of the joined portion 30. The other constituent member in this form is also preferably joined to at least one of the first fiber sheet 11 and the second sheet 12 in the site other than the joined portion 30.

Further, on a surface of the second sheet 12 on a side where the first fiber sheet 11 is not arranged, another constituent member may exist, or another constituent member may not exist, regardless of whether or not it is the formation position of the joined portion 30. The other constituent member in this form may be joined to both the first fiber sheet 11 and the second sheet 12 in the formation site of the joined portion 30, and may be joined to at least one of the first fiber sheet 11 and the second sheet 12 in the site other than the joined portion 30.

On a surface of the first fiber sheet 11 on a side where the second sheet 12 is not arranged, another constituent member may exist, or another constituent member may not exist, regardless of whether or not it is the formation position of the joined portion 30. When another constituent member exists on the surface of the first fiber sheet 11 on the side where the second sheet 12 is not arranged, the other constituent member is preferably arranged in such a manner that at least a part of the first fiber sheet 11 is exposed on an outermost surface of the sheet laminate 10.

The joined portion 30 formed in the sheet laminate 10 is preferably formed in a state in which the constituent resin of the first fiber sheet 11 is embedded in the thermoplastic resin constituting the second sheet 12, and is more preferably formed in a state in which the constituent fibers of the first fiber sheet 11 are embedded in the thermoplastic resin constituting the second sheet 12 with the constituent fibers of the first fiber sheet 11 maintaining fiber shapes thereof.

With such a configuration, it is possible to obtain the sheet laminate 10 with high joining strength between the sheets by sufficiently joining the sheets 11 and 12 in the joined portions 30, even when the fiber including a high-melting-point resin such as the PET resin described above is used, for example, as the constituent fibers of the fiber sheet.

The joined portion 30 like this can be produced by a production method described later, for example. One example of the production method is a method that heats the sheets in such a manner that only the second sheet having a low melting point is melted, by utilizing a difference between the melting points of the first fiber sheet and the second sheet and presses the sheets. By adopting this method, the fibers included in the first fiber sheet are embedded while keeping the fiber shapes. Since the first fiber sheet is embedded while keeping the fiber shapes, layered interface peeling is less likely to occur, and the joining strength between the sheets is enhanced by an anchoring effect. On the other hand, when both the first fiber sheet and the second sheet are melted, the two sheets are layered in the joined portion 30, and interface peeling is likely to occur.

The above "embedded" refers to a state in which the thermoplastic resin constituting the second sheet exists in gaps among the constituent resin of the first fiber sheet, and preferably refers to a state in which the thermoplastic resin constituting the second sheet buries the gaps among the constituent fibers of the first fiber sheet.

Whether or not the joined portion 30 is in an embedded state can be confirmed by observing the site where the joined portion 30 is formed in a cut surface of the sheet laminate 10 cut out into a predetermined size by using a scanning electron microscope (Scanning electron microscope JCM-6000 made by JEOL Ltd.) at a magnification of 50 to 500 times.

Figure 3:
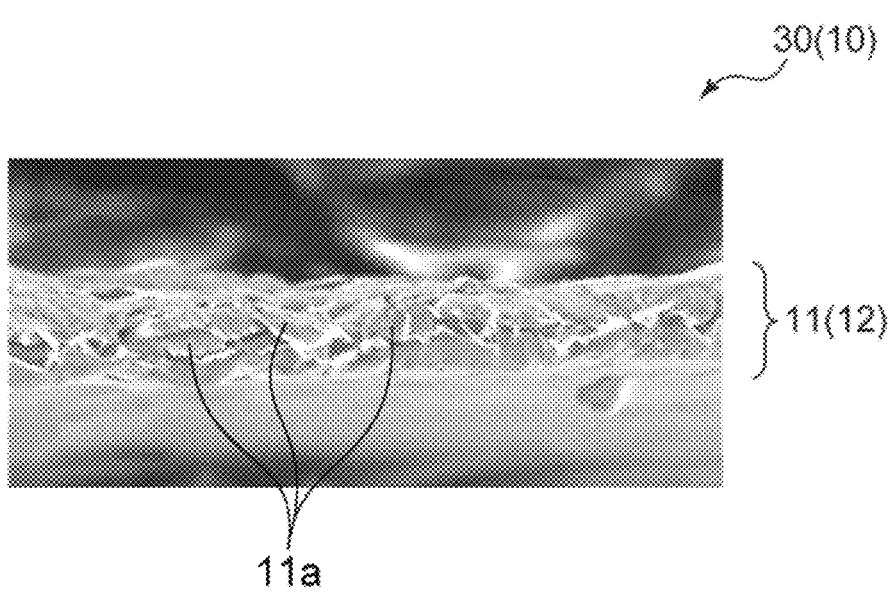
FIG. 3 is an observation image of a scanning electron microscope, of a joined portion section in one embodiment of the sheet laminate.

FIG. 3 shows an example of a sectional shape of the joined portion 30 when observed by the aforementioned method. In the joined portion 30 of the present embodiment, there is not a boundary between the respective sheets 11 and 12, but the thermoplastic resin constituting the second sheet 12 exists in gaps among constituent fibers 11*a* of the first fiber sheet, and thereby join the sheets 11 and 12. Boundaries of the constituent fibers 11*a* of the first fiber sheet and the thermoplastic resin constituting the second sheet 12 are clear. This state is illustrated as reference sign "11(12)" in FIG. 3.

The second sheet 12 includes the thermoplastic resin having the predetermined melting point, and a form of the second sheet 12 is, for example, a fiber sheet or a resin film, and is preferably a fiber sheet.

Specifically, the second sheet 12 is preferably a fiber sheet including fibers including the thermoplastic resin preferably having a melting point of 230° C. or lower.

By adopting a combination of including the thermoplastic resin having the melting point of 230° C. or lower and being a fiber sheet as the second sheet 12, the constituent fibers of the first fiber sheet 11 are easily buried in the thermoplastic resin constituting the second sheet 12.

When the second sheet 12 is a fiber sheet, it is also preferable that the fiber shapes of the constituent fibers of the second sheet are not maintained in the joined portion 30.

In other words, it is preferable that in the second sheet 12 in the joined portion 30, the constituent fibers thereof are melted and the boundaries among the fibers are unclear, or the boundaries disappear.

With such a configuration, the peeling strength of the first sheet and the second sheet can be further enhanced.

Figure 4:
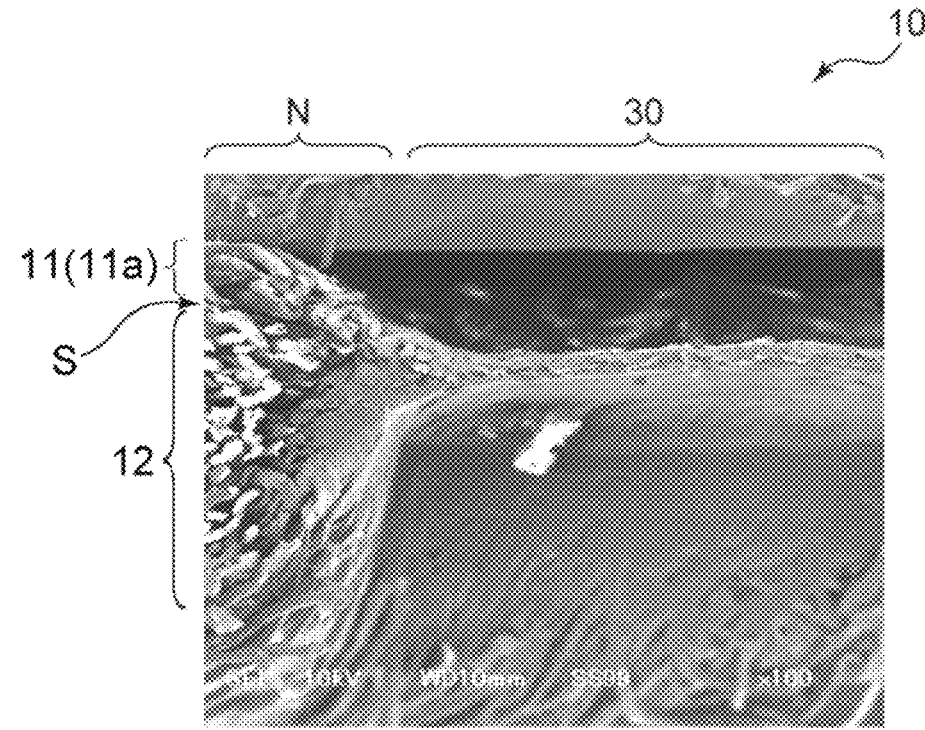
FIG. 4 is an observation image of a scanning electron microscope, of a section including a joined portion and other regions than the joined portion in another embodiment of the sheet laminate.

FIG. 4 shows an example of a sectional shape of the sheet laminate 10 in a case where the second sheet 12 is a fiber sheet.

In the joined portion 30 of the present embodiment, there is no boundary between the respective sheets 11 and 12, the thermoplastic resin constituting the second sheet 12 exists among the constituent fibers of the first fiber sheet, and thereby the joined portion 30 joins the sheets 11 and 12. Further, in the second sheet 12 in the joined portion 30, boundaries among the constituent fibers disappear.

In a non-bonded region N that is a site in which the joined portion 30 is not formed, fiber shapes of the constituent fibers of the respective sheets 11 and 12 are respectively maintained, a boundary S between the sheets 11 and 12, and boundaries among the constituent fibers of the respective sheets 11 and 12 are maintained, and these boundaries are distinguishable.

The joined portion 30 like this can be produced by a production method described later by using a fiber sheet as the second sheet 12, for example.

A ratio of the constituent resins of the respective sheets 11 and 12 will be described hereinafter.

The first fiber constituting the first fiber sheet 11 includes a PET resin having a melting point higher than 230° C. as described above.

A content ratio of the aforementioned PET resin in the resin included in the first fiber is preferably 50% by mass or more, more preferably 80% by mass or more, and even more preferably 100% by mass, from a viewpoint of further improving restorability of sheet bulkiness.

In other words, from the viewpoint of further improving the restorability of the sheet bulkiness, the first fiber is more preferably fiber formed of only a PET resin having a melting point higher than 230° C.

For the content ratio of the PET resin having a melting point higher than 230° C. in the fiber, quantitative analysis is performed based on one or two or more methods of infrared spectroscopy (JIS K0117: 2017), high performance liquid chromatography (JIS K0124: 2011), and nuclear magnetic resonance spectroscopy (JIS K0138: 2018). As a sheet specimen provided for measurement, a site in which a joined portion is not formed, and an adhesive is not attached is used. From a viewpoint of ensuring measurement accuracy, measurement is preferably performed by the two or more methods described above.

The first fiber sheet 11 may be constituted of only the first fiber, or may further include a second fiber that is the other fiber than the first fiber, in addition to the first fiber.

When the first fiber sheet 11 includes the second fiber, the second fiber preferably includes a thermoplastic resin having a melting point of 230° C. or lower, and the second fiber is more preferably constituted of only the thermoplastic resin having a melting point of 230° C. or lower.

By further including the second fiber including the thermoplastic resin having a melting point of 230° C. or lower in the first fiber sheet 11, it is possible to further enhance the joining strength of the sheets in the joined portion 30 by the thermoplastic resin of the second fiber while maintaining restorability of the sheet bulkiness due to the first fiber. In addition to this, it is possible to reduce fluff of the constituent fiber of the first fiber sheet 11 by the second fiber having relatively lower rigidity than the first fiber, so that there is also an advantage that feel to the touch, handleability and usability of the sheet laminate are further improved.

When all melting points of the resins contained in the second fiber are 230° C. or lower, a further advantage is brought about in that both enhancement of the joining strength and reduction in fluff of the fiber can be achieved at a high level.

When the first fiber sheet 11 includes the second fiber, as the thermoplastic resin constituting the second fiber, the same thermoplastic resin as the thermoplastic resin used in the aforementioned second sheet 12 can be used.

From a viewpoint of further enhancing the joining strength of the sheets in the joined portion 30 by improving compatibility with melting of the thermoplastic resins, it is preferable to use the same type of resins as the thermoplastic resin included in the second fiber constituting the first fiber sheet 11, and the thermoplastic resin constituting the second sheet 12, and specifically, it is more preferable that the thermoplastic resin constituting the fiber sheet 11 and the second sheet 12 include resins in which repeating units of the monomers have a common portion with each other.

A content ratio of the first fiber in the first fiber sheet 11 is preferably 25% by mass or more, more preferably 30% by mass or more, and more preferably 45% by mass or more from a viewpoint of restorability of the sheet bulkiness.

Further, the content ratio of the first fiber in the first fiber sheet 11 is 100% by mass or less.

A content ratio of the second fiber in the first fiber sheet 11 is preferably 1% by mass or more, more preferably 10% by mass or more, and even more preferably 30% by mass or more from a viewpoint of further enhancing the joining strength of the sheets.

Further, the content ratio of the second fiber in the first fiber sheet 11 is preferably 80% by mass or less, more preferably 65% by mass or less, and more preferably 55% by mass or less from a viewpoint of restorability of the bulkiness of the sheet.

A content ratio of fibers in the first fiber sheet 11 can be measured by the following methods. In detail, the content ratio of the fibers can be measured by one or two or more analysis methods of an infrared spectroscopy, a nuclear magnetic resonance method, a pyrolysis gas chromatography mass spectrometry, a method for separating components using difference in resin solubility in a solvent, a method combining component separation and elemental analysis, and a method combining component separation and an infrared spectroscopy.

When the second sheet 12 is a fiber sheet, the constituent fiber of the second sheet 12 may be one type of fiber, or may be a plurality of types of fiber. One type of fiber is constituted of one type of resin or a plurality of types of resins. A plurality of types of fibers are constituted of two or more types of fibers. In any case, from a viewpoint of expressing sufficient joining strength in the joined portion, each constituent fiber of the second sheet 12 preferably includes a thermoplastic resin having a melting point of 230° C. or lower, and is more preferably constituted of only a thermoplastic resin having a melting point of 230° C. or lower.

As a fiber aggregate constituting the first fiber sheet 11, various fiber sheets such as a woven fabric and nonwoven fabric can be used.

Examples of a form of the second sheet 12 include a resin film including the aforementioned thermoplastic resin, various fiber sheets such as a woven fabric and nonwoven fabric and the like.

Of these forms, at least one of the first fiber sheet and the second sheet is preferably a nonwoven fabric.

When a nonwoven fabric is used for the respective sheets 11 and 12, it is possible to use various nonwoven fabrics such as an air-through nonwoven fabric, an air-laid nonwoven fabric, spun-bonded nonwoven fabric, a spun-lace nonwoven fabric, a melt-blown nonwoven fabric, a needle-punch nonwoven fabric, and an electrospinning nonwoven fabric.

From a viewpoint of achieving both formability of the sheet and restorability of bulkiness, an air-through nonwoven fabric or a needle-punch nonwoven fabric is preferably used for the first fiber sheet 11.

The bag 20 is typically constituted of a sheet material.

The sheet material used for the bag 20 can be appropriately changed in accordance with the constituent members of the sheet laminate 10, properties thereof and the like, but is typically a resin film. As the resin film, a single-layer or multi-layer resin film, or a resin film obtained by laminating an inorganic thin film on the resin film (Hereinafter, also referred to as an inorganic-substance-containing film.) can be used.

Examples of the resin film include resin films including the aforementioned thermoplastic resin as a raw material.

Examples of the inorganic-substance-containing film include a sheet in which a thin metal film of an aluminum or the like is laminated on the aforementioned resin film, a sheet in which an inorganic oxide or the like such as an aluminum oxide or silica is vapor-deposited on the resin film and the like.

By using the inorganic-substance-containing sheet as the bag 20, it is possible to improve a light blocking effect and air tightness when packaging the sheet laminate 10.

The sheet laminate 10 is preferably accommodated in the bag 20 in a state in which a predetermined pressure is applied.

In detail, the pressure applied to the sheet laminate 10 in the package 1 is preferably 500 Pa or more, more preferably 1 000 Pa or more, and even more preferably 2 000 Pa or more, from a viewpoint of space saving of the package 1 during storage and distribution.

The pressure applied to the sheet laminate 10 is preferably 5 000 Pa or less, more preferably 4 000 Pa or less, and even more preferably 3 000 Pa or less, from a viewpoint of easily restoring the bulkiness of the sheet laminate, after opening the bag.

The pressure applied to the sheet laminate 10 in the package 1 can be measured by the following methods. In detail, the pressure applied to the packaged sheet laminate is measured by using a pressure sensor. Alternatively, a thickness and dimensions of the sheet laminate are calculated from a thickness and an outer shape of the package, and from a reaction force when compressing the sheet laminate to such dimensions, the pressure applied to the sheet laminate can be measured.

The form and application of the sheet laminate 10 are not particularly limited as long as it has the aforementioned configuration. Examples of the form of the sheet laminate 10 include a cleaning sheet for cleaning hard surfaces of a floor, wall and the like, sanitary products and the like.

Of these products, the sheet laminate 10 accommodated in the bag 20 is preferably a sanitary product. Since the sheet laminate 10 as a sanitary product is accommodated in the bag 20, cleanliness of the sanitary product can be maintained, and deterioration of the sanitary product can be prevented.

A sanitary product is a product used in contact with a skin of a user when it is used. More specifically, examples of the sanitary product include items that are directly worn by a human body to cover eyes, a nose, mouth or an excretion part such as a urethra or anus, or a vicinity thereof, and an item that maintains a worn state while attached to clothing of a wearer.

Specific examples of the sanitary product like this include a cleaning sheet for cleaning skin of a user such as fingers, an absorbent article, a face mask, an eye mask, a warming device and the like, but are not limited to these examples.

Examples of the absorbent article include a disposable diaper, a sanitary napkin, a urine collecting pad and the like.

When the sanitary product is an item to wear such as an absorbent article, a face mask, an eye mask, or a warming device, the first fiber sheet 11 in the sheet laminate 10 preferably constitutes a skin-facing surface of the sanitary product.

The other constituent members that can constitute the sheet laminate 10 can be appropriately changed in accordance with a target article. Examples of the other constituent members include a single-layer or multi-layer sheet material, an absorbent member including an absorbent material, a heating element including an oxidizable metal and the like. These other constituent members can be used alone or in combination of two or more.

When the sheet laminate 10 is an absorbent article, an example of the other constituent member includes an absorbent member that includes an absorbent material that can retain excreted body fluids. The absorbent member is typically constituted of a laminate or stacked fiber containing an absorbent material. The absorbent material is typically an absorbent polymer or absorbent fiber. The absorbent member is located on an outer surface of the first fiber sheet 11 or the second sheet 12, or held between the first fiber sheet 11 and the second sheet 12 in a site other than formation sites of the joined portions 30.

When the sheet laminate 10 is a warming device, an example of the other constituent member includes a heating element including an oxidizable metal. The heating element is typically constituted of an oxidizable metal such as iron powder, and a mixed composition including a carbon material, an electrolyte and water. The heating element is typically held between the first fiber sheet 11 and the second sheet 12 in the site other than the formation sites of the joined portions 30.

Hereinafter, a production method of the sheet laminate 10 and the package 1 will be described by taking the form of the sheet laminate 10 of a two-layer structure shown in FIG. 2 as an example.

A production device 100 that is preferably used in production of the sheet laminate 10 typically includes original fabric rolls 110 and 120 a joined portion formation unit 130, and a package forming unit 140.

Figure 5:
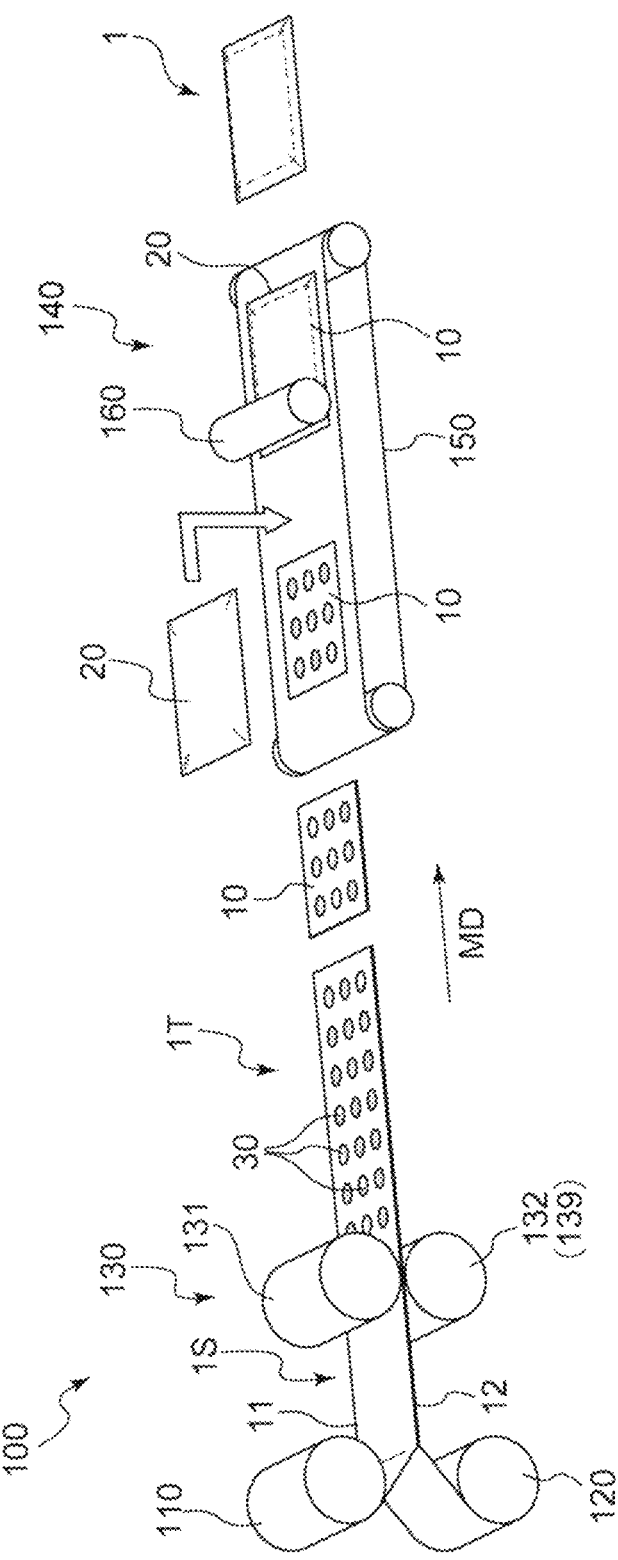
FIG. 5 is a perspective view schematically showing one embodiment of a production device that produces a package.

One example of the production device 100 like this is shown in FIG. 5.

First, an original fiber sheet that constitutes the first fiber sheet 11 is paid out from the first original fabric roll 110, and is conveyed in a conveyance direction MD.

Similarly, an original fiber sheet that constitutes the second sheet 12 is paid out from the second original fabric roll 120 arranged separately from the first original fabric roll 110, and is conveyed in the conveyance direction MD.

Subsequently, the first fiber sheet 11 and the second sheet 12 are overlaid on each other to form an intermediate laminate 1S. The present embodiment has a form in which the first fiber sheet 11 is laminated and overlaid on a top surface of the second sheet 12.

At this time, the first fiber sheet 11 and the second sheet 12 are preferably overlaid on each other so as to have an adjacent site in which the sheets 11 and 12 are adjacent to each other. The adjacent site configure a part or whole of planned formation positions of the joined portions 30.

The intermediate laminate 1S in this form is a continuous laminate extending in the conveyance direction MD, and the respective sheets 11 and 12 are not joined to each other.

The first fiber sheet 11 preferably includes the fiber including a PET resin having a melting point higher than 230° C.

The second sheet 12 preferably includes a thermoplastic resin having a melting point of 230° C. or lower.

The aforementioned explanation is appropriately applied to explanation concerning the first fiber sheet 11 and the second sheet 12.

In producing the sheet laminate 10, it is possible to further use a third sheet (not illustrated) as another constituent member, for example, in addition to the first fiber sheet 11 and the second sheet 12. In this case, the first fiber sheet 11 is laminated and overlaid on an original sheet of the second sheet 12, an original sheet of the third sheet constituting the third sheet is paid out from a third original fabric roll (not illustrated) and conveyed along the conveyance direction MD, and the third sheet is laminated and overlaid on a top surface of the first fiber sheet 11 or a bottom surface of the second sheet 12. Thereby, the intermediate laminate 1S having a multi-layer structure with three or more layers can be formed.

In this case, the third original fabric roll is a separate body from the first original fabric roll 110 and the second original fabric roll 120.

The intermediate laminate 1S in this form is a continuous laminate extending in the conveyance direction MD, and the respective sheets constituting the intermediate laminate 1S are not joined to one another.

In the intermediate laminate 1S in this mode, at least the first fiber sheet 11 and the second sheet 12 are configured to be adjacent to each other.

On producing the sheet laminate 10, it is possible to further use an absorbent member or a heating element (not illustrated) as the constituent member, for example, in addition to the first fiber sheet 11 and the second sheet 12. In this case, the other constituent member is arranged at predetermined spaces between the original sheet of the first fiber sheet 11 that is paid out and the original sheet of the second sheet 12 that is paid out, and in this state, the first fiber sheet 11 and the second sheet 12 are overlaid on each other so as to have the adjacent site.

In this way, it is possible to obtain the intermediate laminate 1S in the state in which the other constituent member is arranged between the first fiber sheet 11 and the second sheet 12.

Subsequently, the intermediate laminate 1S is introduced into the joined portion formation unit 130, and the respective sheets are joined and integrated by pressing the first fiber sheet 11 and the second sheet 12 in the sheet thickness direction while heating the first fiber sheet 11 and the second sheet 12 in the adjacent site. Thereby, the joined portions 30 are formed in the adjacent site.

The joined portions 30 in the present embodiment are formed into a dotted pattern, but shapes in plan view of the joined portions 30 can be appropriately changed in accordance with the target sheet laminate 10.

The joined portions 30 may be formed in an entire region in plan view of the adjacent sites of the first fiber sheet 11 and the second sheet 12, or may be formed in only a part of the region in plan view of the adjacent sites.

In formation of the joined portions 30, it is preferable to join the adjacent sites of the first fiber sheet 11 and the second sheet 12 by introducing the intermediate laminate 1S between a pair of rollers. By adopting the method like this, a push load in the sheet thickness direction that is generated at the time of joining the sheets is applied to a small area, and therefore the raw material resin of the second sheet 12 is more easily melted and can efficiently embed the constituent fibers of the first fiber sheet, so that joining strength with the first fiber sheet 11 in the joined portions 30 can be further enhanced.

FIG. 5 illustrates a mode including a pair of rollers 131 and 132 as the joined portion formation unit 130. The present embodiment is a mode that performs heating and pressurization simultaneously by applying heat and pressure to the intermediate laminate 1S by the rollers as rotating members.

The rollers 131 and 132 shown in FIG. 5 is arranged in such a manner that axial directions thereof and the conveyance direction MD are orthogonal to each other.

The respective rollers 131 and 132 shown in FIG. 5 are arranged so as to face each other in a state in which the axial directions thereof coincide with each other.

At least one of the pair of rollers 131 and 132 is preferably rotatable by a drive source. In this case, the other roller may perform contact rounding, or may be rotatable by a drive source.

The respective rollers 131 and 132 shown in FIG. 5 are arranged in a state in which rotation directions thereof and the conveyance direction MD coincide with each other.

The joined portion formation unit 130 preferably adopts a device capable of forming the joined portion 30 by pressing the adjacent sites of the first fiber sheet 11 and the second sheet 12 in the sheet thickness direction while heating the adjacent sites.

As the device like this, for example, a heat seal device, an impulse seal device, an ultrasonic seal device and the like can be used.

From a viewpoint of efficiently forming the joined portions 30 in which the first fiber is embedded, and further enhancing the joining strength of the sheets, it is preferable to press the adjacent sites while heating the adjacent sites to a temperature that is equal to or higher than the melting point of the thermoplastic resin included in the second sheet 12, in heating and pressing of the adjacent sites. In order to achieve the mode like this, it is possible to make adjustment by appropriately changing a temperature of the heat seal, or appropriately changing the output of ultrasonic waves, for example.

When the mode including the pair of rollers 131 and 132 is adopted as the joined portion formation unit 130, a peripheral surface of at least one roller of both the rollers 131 and 132 preferably has a depressed-and-projected shape. Since the peripheral surface of the roller has the depressed-and-projected shape, the joined portions 30 can be formed in desired positions of the adjacent sites, and quality of the sheet laminate 10 to be obtained is improved.

When the depressed-and-projected shape is formed on only the peripheral surface of the one roller, a peripheral surface of the other roller that does not have the depressed-and-projected shape is flat.

When the roller has the depressed-and-projected shape on the peripheral surface of the roller, the projections of the roller typically correspond to the formation positions of the joined portions 30.

When the mode including the pair of rollers 131 and 132 is adopted as the joined portion formation unit 130, it is preferable to use the mode in which one roller includes an ultrasonic horn, and the other roller is an anvil roller. In other words, it is preferable to use an ultrasonic seal device including a pair of rollers as the joined portion formation unit 130.

It is possible to heat the constituent resin of the second sheet constituted of the constituent resin having a low melting point from an inside of the laminate by applying ultrasonic waves to melt the constituent resin efficiently. Further, by applying ultrasonic waves while pressing the sheets between both the rollers, it is possible to apply the pressing force in the sheet thickness direction that is generated during joining of the sheets to a small area, and embed the constituting fibers of the first fiber sheet into the resin of the second sheet efficiently when forming the joined portions 30. As a result, it is possible to further enhance the joining strength of both the sheets 11 and 12 in the joined portions 30.

When the mode in which the pair of rollers 131 and 132 are included and the one roller includes an ultrasonic horn is adopted as the joined portion formation unit 130, the intermediate laminate 1S is preferably introduced and joined in such a manner that the peripheral surface of the one roller including the ultrasonic horn and the second sheet 12 in the intermediate laminate 1S abut on each other.

In other words, in the present embodiment, ultrasonic waves can preferably be applied to the intermediate laminate 1S in a state in which the second roller 132 as the joined portion formation unit 130 includes an ultrasonic horn.

By joining the sheets in such an arrangement, the second sheet 12 having a low melting point is arranged at a side close to a source of generation of ultrasonic waves, so that the second sheet 12 is more effectively melted, and embedding performance of the constituent fibers of the first fiber sheet in the joined portions 30 that are formed is further enhanced. As a result, the joining strength of both the sheets 11 and 12 can be further enhanced.

Figure 6:
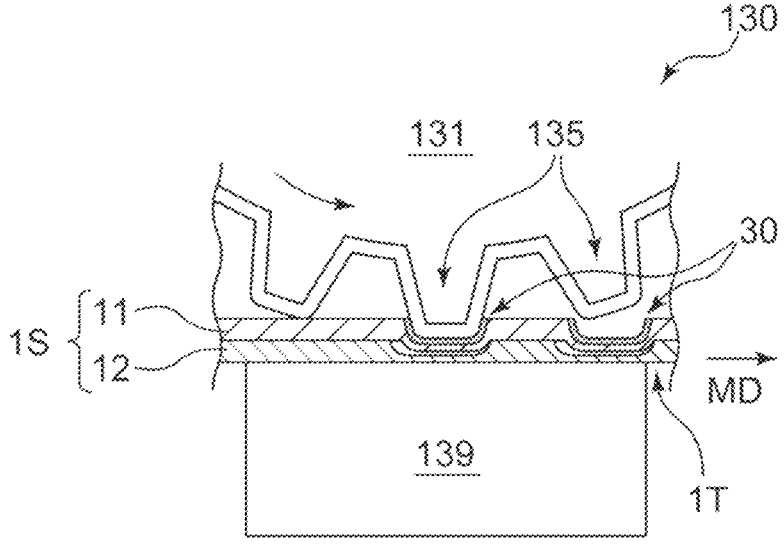
FIG. 6 is a sectional view schematically showing one embodiment of a joined portion formation unit in the production device shown in FIG. 5.
Figure 7:
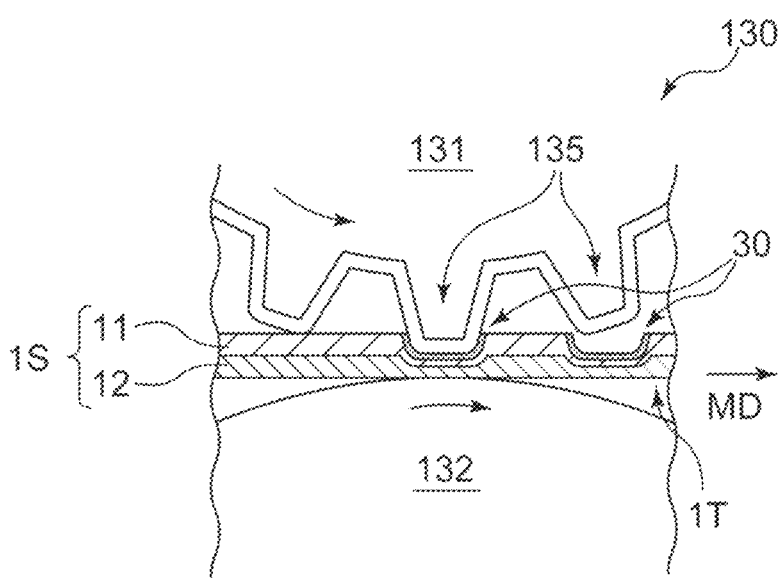
FIG. 7 is a sectional view schematically showing another embodiment of the joined portion formation unit in the production device shown in FIG. 5; and Each of FIGS. 8(*a*) to 8(*e*) is a plan view schematically showing a shape in plan view of a roller projection in one embodiment of the joined portion formation unit.

Joining modes of the sheets 11 and 12 in a case of adopting the mode including the ultrasonic horn as the joined portion formation unit 130 are schematically shown in FIG. 6 and FIG. 7.

An embodiment shown in FIG. 6 includes, as the joined portion formation unit 130, an anvil roll 131 having a depressed-and-projected shape on a peripheral surface, and an ultrasonic horn 139 having a flat plate shape and fixedly disposed to face the anvil roller 131. In other words, the present embodiment is a fixed ultrasonic sealing device.

In the embodiment shown in FIG. 6, when the intermediate laminate 1S is introduced into the joined portion formation unit 130, the intermediate laminate 1S is pressed in the thickness direction by projections 135 of the anvil roller 131. The joined portions 30 formed in this way can achieve joining strength of the sheets that can withstand actual use.

An embodiment shown in FIG. 7 has a mode in which a pair of rollers 131 and 132 are included, and one of the rollers includes an ultrasonic horn. In detail, the one roller 131 is an anvil roller having a depressed-and-projected shape on a peripheral surface thereof, and the other roller 132 is a roller having a flat peripheral surface and including an ultrasonic horn. In other words, the present embodiment is a rotary ultrasonic sealing device.

Further, as another embodiment, a thermal embossed roller having a flat peripheral surface, that is, a rotary heat seal device may be adopted as the other roller 132.

In the case of the form of the rotary ultrasonic sealing or the heat seal, heat and pressure are applied to only contact site, at which the sheets 11 and 12 are in contact, with the rollers.

Of these rollers, the roller including the ultrasonic horn is preferable from a viewpoint of enhancing production efficiency of the sheet laminate 10 due to enhancement in formation efficiency of the joined portions.

As in the embodiment shown in FIG. 7, by adopting the rotary sealing device, it is possible to efficiently form the joined portions having the structure in which the fibers are embedded by preventing the constituent resin melted by heating from outside from easily diffusing in a planar direction of the sheet, and preventing transmission of heat or the like from becoming poor due to generation of frictional force and shearing force other than the pressing load to the sheet thickness direction. As a result, the joining strength can be enhanced. The present embodiment is advantageous in particular in that the joined portions having the structure in which fibers are embedded can be efficiently formed even when the conveying speed of the intermediate laminate in which the joined portions 30 are formed is increased. Further, the present embodiment is also highly efficient and advantageous in the continuous productivity of the sheet laminates having the shape such as a long continuous shape, for example.

In one preferable embodiment of the present invention shown in FIG. 7, when the intermediate laminate 1S is introduced into the joined portion formation unit 130, the intermediate laminate 1S is pressed in the sheet thickness direction by the projections 135 of the anvil roller 131. With this, the respective rollers 131 and 132 rotate to correspond to the conveying speed of the intermediate laminate 1S. Thereby, as compared with the embodiment shown in FIG. 6, a contact area of the intermediate laminate 1S and the other roller 132 can be decreased. As a result, even when the conveyance speed of the intermediate laminate 1S is increased from the viewpoint of enhancing the production efficiency, the frictional force generated in the direction intersecting the pressing direction of the anvil roller 131 can be reduced between the intermediate laminate 1S and the roller 132 including the ultrasonic horn. In the formation positions of the joined portions 30 that are positions corresponding to the projections 135 of the anvil roller 131, a deviation in the conveyance direction between the first fiber sheet 11 and the second sheet 12 can be suppressed. Further, a pressing force that is generated between the projections 135 in the anvil roller 131 and the peripheral surface of the other roller 132 can be increased.

In the joined portion 30 formed in this state, heat and pressure are applied to only the contact site, at which the sheets 11 and 12 are in contact, with the rollers, so that the pressure applied to the sheets 11 and 12 at a time of joining is increased. Due to this, melt of the constituent resin of the second sheet efficiently advances, and the joining strength of the sheets can be expressed higher. In addition to this, the respective rollers 131 and 132 rotate to correspond to the conveying speed of the intermediate laminate 1S, so that dimensions of the joined portions 30 are less likely to fluctuate, and the joined portions 30 can be formed in a desired shape.

Accordingly, adoption of the mode in which the pair of rollers 131 and 132 are included and the one roller includes an ultrasonic horn when joining the sheets is advantageous in that the dimensional accuracy of the joined portions 30 is enhanced and products with high quality can be obtained, in addition to further enhancement of the sheet joining strength.

When the mode in which the peripheral surface of at least one roll has a depressed-and-projected shape is used as the joined portion formation unit 130, the joined portion 30 is preferably formed in such a manner that a ratio (P2/P1) of a maximum value P2 of linear pressure of the roller having the depressed-and-projected shape on the peripheral surface to a minimum value P1 of the linear pressure is a predetermined value or less, and P1 is a value more than 0.

The linear pressure of the roller having the depressed-and-projected shape on the peripheral surface is generated at positions of the projections of the roller having the depressed-and-projected shape on the peripheral surface. Accordingly, the linear pressure of the roller is based on a dimension along a direction orthogonal to the conveyance direction MD in the projections of the roller having the depressed-and-projected shape on the peripheral surface.

From a viewpoint of making the strength of the respective joined portions constant, and obtaining the sheet laminate having a good appearance, the P2/P1 ratio is preferably 4 or less, more preferably 2 or less, and even more preferably 1 or less.

The P2/P1 ratio of 1 or more is realistic. In other words, the present mode also includes a case in which the minimum value P1 and the maximum value P2 are the same.

In particular, when the sheet laminate is an article to wear such as an absorbent article, a face mask, an eye mask, or a warming device, an external force is applied to the sheet laminate in accordance with movement of a wearer, so that expression of strength is important in actual use.

The minimum value P1 is preferably 30 N/m or more, and more preferably 50 N/m or more, and is preferably 150 N/m or less, and more preferably 120 N/m or less.

The maximum value P2 is preferably 50 N/m or more and more preferably 100 N/m or more, and is preferably 200 N/m or less and more preferably 150 N/m or less.

The minimum value P1 and the maximum value P2 can be changed by appropriately adjusting a space between the rollers, and dimensions of the projections of the roller having the depressed-and-projected shape.

FIGS. 8(a) to 8(e) illustrate shapes in plan view of the projections 135 of the roller having the depressed-and-projected shape on the peripheral surface. In FIGS. 8(a) to 8(e), a direction orthogonal to the conveyance direction MD is shown as reference sign CD.

In FIG. 8(a), the shape of the projection 135 is a rectangular form in which a direction in which a long side extends coincides with a CD direction. In this case, the minimum value P1 and the maximum value P2 are the same as each other.

In FIG. 8(b), the shape of the projection 135 is in a form of a perfect circle. In this case, the minimum value P1 and the maximum value P2 are the same as each other.

In FIG. 8(c), the shape of the projection 135 is in a form of a wave shape. In this case, the minimum value P1 and the maximum value P2 are different from each other.

In FIG. 8(d), the shape of the projection 135 is in a form of a trapezoid having no cavity inside. In this case, the minimum value P1 and the maximum value P2 are different from each other.

In FIG. 8(e), the shape of the projection 135 is in a form of a trapezoid having a cavity inside. In this case, the minimum value P1 is determined in illustrated positions, and the maximum value P2 is determined in a total of the illustrated positions.

The intermediate laminate 1S of the present embodiment obtained by passing through the joined portion formation unit 130 is a long continuous sheet 1T in which the joined portions 30 are formed. By applying processing (not illustrated) of cutting or the like to the long continuous sheet 1T in such a manner that the sheet 1T has predetermined dimensions, it is possible to obtain the sheet laminate 10 in a form of a single sheet in which the joined portions 30 are formed.

Further, in accordance with a target product, another constituent member may be attached by joining or the like before or after cutting the long continuous sheet 1T to produce the sheet laminate 10 (not illustrated).

Subsequently, the obtained sheet laminate 10 is accommodated in the bag 20 produced in a different process, and a package 1 in which the sheet laminate 10 is packaged in the bag 20 is obtained (see FIG. 5).

In detail, the sheet laminate 10 in the form of a single sheet is conveyed in the conveyance direction MD by using a conveyance device 150 such as a belt conveyor, and the sheet laminate 10 is accommodated in the bag 20. At this time, the bag 20 preferably has an opening so as to be able to accommodate the sheet laminate 10.

Subsequently, the opening of the bag 20 in which the sheet laminate 10 is accommodated is joined by a known joining method such as heat seal to package the sheet laminate 10.

When the sheet laminate 10 is packaged with the bag 20, the sheet laminate 10 is preferably packaged in a state in which a predetermined pressure is applied from an outside of the bag 20.

In detail, the pressure that is applied during packaging is preferably 500 Pa or more, more preferably 1 000 Pa or more, and even more preferably 2 500 Pa or more, from a viewpoint of space saving during storage and distribution of the obtained package 1.

When the sheet laminate is a warming device including a heating element using an oxidation reaction, for example, as one embodiment of the sheet laminate, the pressure that is applied during packaging is preferably 500 Pa or more, more preferably 1 000 Pa or more, and even more preferably 2 500 Pa, from a viewpoint of preventing air from entering the bag during packaging, and enhancing air-tightness of the package that is obtained.

From a viewpoint of easily restoring bulkiness of the sheet laminate after opening the bag, the pressure that is applied during packaging is preferably 5 000 Pa or less, more preferably 4 000 Pa or less, and even more preferably 3 000 Pa or less.

As illustrated in FIG. 5, it is possible to apply the aforementioned pressure by providing a nip roller 160 that is disposed to face the conveying device 150, appropriately adjusting a space between the conveying device 150 and the nip roller 160, and introducing the bag 20 in which the sheet laminate 10 is accommodated to between the conveying device 150 and the nip roller 160.

By going through the above process, it is possible to obtain the package 1. The package 1 can be stored and distributed directly or in a state where a plurality of packages 1 are accommodated in a separate packing material.

In each of the aforementioned embodiments, the package 1 is described with the form in which the sheet laminate 10 is individually packaged in the bag 20 taken as an example, but the package 1 is not limited to this form. For example, the package 1 may be such that a plurality of sheet laminates 10 are accommodated and packaged in the single bag 20. In this case, the sheet laminates 10 are preferably accommodated in the state in which they are applied the aforementioned preferable pressure.

The sheet laminate 10 to be packaged may be packaged in a folded state.

The present invention is described based on the preferable embodiments thus far, but the present invention is not limited to the aforementioned embodiments.

EXAMPLES

Hereinafter, the present invention will be described in more detail based on examples. However, the scope of the present invention is not limited to these examples.

In the following explanation, including Table, a PET resin having a melting point of higher than 230° C. will also be referred to as "high PET", and a PET resin having a melting point of 230° C. or lower will also be referred to as "low PET".

In Table 1, the melting point of the low PET was 80° C., the melting point of PP was 160° C., and the melting point of an ethylene-propylene copolymer was 160° C. All the components including two types of fibers have 50% by mass of each of the two types of fibers.

Further, in Table 1, the columns shown by "-" show non-containing or not evaluated.

Further, in Table 1, "% by mass" in explanation of fiber shows a mass ratio of the fiber in the sheet.

Example 1

The first fiber sheet 11 and the second sheet 12 that was a fiber sheet, which had resin compositions and basis weights shown in Table 1 below were used. The first fiber sheet 11 of the present example was a fiber aggregate formed of only a PET resin fiber having a melting point higher than 230° C., and the second sheet was a fiber aggregate formed of only a PP fiber having a melting point of 170° C.

The first fiber sheet 11 and the second sheet were overlaid on each other so as to have the adjacent sites, the adjacent sites were joined by using an impulse seal device (FA series, made by FUJIIMPULSE® CO., LTD.), and the joined portions 30 were formed. Formation pattern of the joined portions 30 was a shape of a plurality of continuous lines (stripe shape) that was a continuous pattern.

Thereafter, as the other constituent member, the fiber sheet including the resins shown in Table 1 below was arranged on and joined to the surface on the side where the second sheet does not exist in the first fiber sheet 11, and the sheet laminate 10 of a three-layer structure was obtained.

Subsequently, the sheet laminate 10 was accommodated in the bag 20 made of an aluminum and polyethylene, and four sides of the bag were seal-processed to be hermetically sealed while pressure of 1 500 Pa is applied from the outer surface of the bag 20 accommodating the sheet laminate 10.

Thereby, the package 1 in which the sheet laminate 10 is packaged in the bag 20 was obtained.

Examples 2 and 3

The package 1 was obtained by the same method as in example 1, except that the joined portions 30 were formed to the first fiber sheet 11 shown in Table 1 below, instead of the content of example 1.

Examples 4 and 5

The package 1 was obtained by the same method as in example 1, except that the joined portions 30 in the shape shown in FIG. 8(c) were formed to the first fiber sheet 11 and the second sheet 12 that was the fiber sheet which are shown in Table 1 below, and by using the rotating ultrasonic sealing device having the configuration as shown in FIG. 5, instead of the content of example 1.

Comparative Example 1

The joined portions 30 in the shape shown in FIG. 8(d) were formed to the first fiber sheet 11 and the second sheet 12 that is a fiber sheet which are shown in Table 1 below, and using a heat seal device, instead of the content of example 1.

As the other constituent member, the fiber sheet including the resin shown in Table 1 below was arranged on and joined to the surface on the side where the second sheet does not exist in the first fiber sheet 11, and the sheet laminate 10 of a three-layer structure was obtained.

The package 1 was obtained by the same method as in example 1, except for the above.

Reference Examples 1 to 13

The present reference examples are examples in which the sheet laminates 10 themselves were produced mainly for evaluation of the sheet joining strength. In each of the present reference examples, the sheet laminate 10 was not packaged in the bag 20.

(1) Reference Example 1

The joined portion 30 in the shape shown in FIG. 8(d) was formed to the first fiber sheet 11 and the second sheet that was a fiber sheet which are shown in Table 1 below, and using a fixed ultrasonic sealing device that had a configuration as shown in FIG. 6, instead of the content of example 1.

In the present reference example, at the time of formation of the joined portion 30, the first fiber sheet 11 and the second sheet 12 were introduced into the ultrasonic sealing device in such a manner that the ultrasonic horn and the second sheet 12 abut on each other.

Subsequently, as the other constituent member, the fiber sheet including the resin shown in Table 1 below was arranged on and joined to the surface on the side where the second sheet does not exist in the first fiber sheet 11, and the sheet laminate 10 of a three-layer structure was obtained.

(2) Reference Example 2

The joined portion 30 in the shape of FIG. 8(c) was formed to the first fiber sheet 11 and the second sheet that is a fiber sheet which are shown in Table 1 below, and using the rotary ultrasonic sealing device having the configuration as shown in FIG. 7, instead of the content in example 1.

In the present reference example, the first fiber sheet 11 and the second sheet 12 were introduced into the ultrasonic sealing device in such a manner that the roller peripheral surface including an ultrasonic horn and the second sheet 12 abut on each other at the time of formation of the joined portion 30.

Subsequently, as the other constituent member, the fiber sheet including the resin shown in Table 1 below was arranged on and joined to the surface on the side where the second sheet does not exist in the first fiber sheet 11, and the sheet laminate 10 of a three-layer structure was obtained.

(3) Reference examples 3 to 11

The joined portions 30 in the shape shown in FIG. 8 (c) were formed to the first fiber sheets 11 and the second sheets that were fiber sheets shown in Table 1 below, and using a rotary ultrasonic sealing device having the configuration as shown in FIG. 7, instead of the content in Example 1.

In each of reference examples 4, 6, 8, 9 and 11, the first fiber sheet 11 and the second sheet were introduced into the ultrasonic sealing device in such a manner that the roller peripheral surface including an ultrasonic horn and the first fiber sheet 11 abut on each other at the time of formation of the joined portion 30.

In each of reference examples 3, 5, 7 and 10, the first fiber sheet and the second sheet 12 were introduced into the ultrasonic sealing device in such a manner that the roller peripheral surface including an ultrasonic horn and the second sheet 12 abut on each other at the time of formation of the joined portion 30.

Subsequently, as the other constituent members, the fiber sheets including the resins shown in Table 1 below were each arranged on and joined to the surface on the side where the second sheet does not exist in the first fiber sheet 11, and the sheet laminates 10 of a three-layer structure were obtained.

[Presence or Absence of Embedding of Constituent Resin of First Fiber Sheet]

Whether or not the constituent resin of the first fiber sheet is embedded in the resin in the formation site of the joined portion 30 was observed by the aforementioned method, and evaluated according to the following criteria. The result is shown in Table 1.

<Evaluation Criteria>

A: The joined portion 30 is formed in the state in which the constituent fibers are embedded in the thermoplastic resin with the fiber shapes of the constituent fibers of the first fiber sheet are maintained.

B: The joined portion 30 is formed in the state in which the fiber shapes of the constituent fibers of the first fiber sheet are unclear or disappear.

C: The joined portion is not formed, or the seal strength of the first fiber sheet and the second sheet that is measured by a method described later does not reach 2N/50 mm.

[Evaluation of Bulkiness Restoration Rate]

For the packages 1 of the examples and comparative examples, the bulkiness restoration rates of the sheet laminates 10 after opening were evaluated by the following method. In detail, a thickness W1 of the sheet laminate before packaging and a thickness W2 of the sheet laminate directly after being opened from the bag after being stored for 24 hours or more after being packaged were respectively measured by applying pressure of 3.7 gf/cm² by using a constant pressure thickness measuring device (J-Type PG-11 made by Teclock Co.), and a value by (W2/W1)−100(%) was calculated as a restoration rate. Higher numerical values of the restoration rate show earlier restoration of bulkiness at the time of being opened from the bag, and more excellent flexibility and usability. The result is shown in Table 1 below.

[Evaluation of Seal Strength]

For the sheet laminates 10 of the examples, comparative examples and reference examples, the joining strength of the first fiber sheets and the second sheets were evaluated by the following method. As the value of the seal strength is higher, the joining strength is higher. The result is shown in Table 1 below.

In detail, from the sheet laminates 10, measurement samples each with a size of a length of 50 mm×width of 50 mm were cut out so as to include the formation positions of the joined portions 30 in such a manner that the peripheries of the samples coincided with the edges of the joined portions.

Next, in one end in the longitudinal direction of each of the measurement samples, the respective sheets are fixed to the respective chucks of the tensile tester. As the tensile tester, AUTOGRAPH AGS-X series by Shimadzu Corporation is used. The distance between the chucks was set at 48 mm.

The maximum strength (N) was measured by performing peeling of the first fiber sheet and the second sheet at a tensile speed of 500 mm/min. Measurement was performed three times, and an arithmetic mean value of the maximum strength was taken as the seal strength (N).

[Evaluation of Feel to Touch (1): Feel to Touch at the Time of Contact]

For the packages 1 of the examples and comparative examples, a sensory evaluation was performed on feel at the moment when the sheet laminate 10 after opening was pressed against eyes. The evaluators were 5 or 6 females who had been engaged in the work of evaluating the feel of the sheet laminate to the eyes for 3 years or more, and comparative evaluation was performed on the examples using Comparative Example 1 as a contrast example. An arithmetic average score was calculated by dividing the total score by the number of evaluators, with +10 points when the examples were better and −10 points when the comparative example was better. The higher scores show better feel at the time of contact of the sheet laminate and the skin and more excellent usability. The result is shown in Table 1 below.

[Evaluation of Feel to Touch (2): Feel to Touch in Worn State]

For the packages 1 of the examples and comparative examples, the state in which the sheet laminate 10 after opening was pressed against the eyes was maintained, and a sensory evaluation on the feel at that time was performed. The evaluators were 5 or 6 females who had been engaged in the work of evaluating the feel of the sheet laminate to the eyes for 3 years or more, and comparative evaluation was performed on the examples using Comparative Example 1 as a contrast example. An arithmetic average score was calculated by dividing the total score by the number of evaluators, with +10 points when the examples were better and −10 points when the comparative example was better. The higher scores show better feel and more excellent usability of the sheet laminate when used. The result is shown in Table 1 below.

TABLE 1

Figure 8:
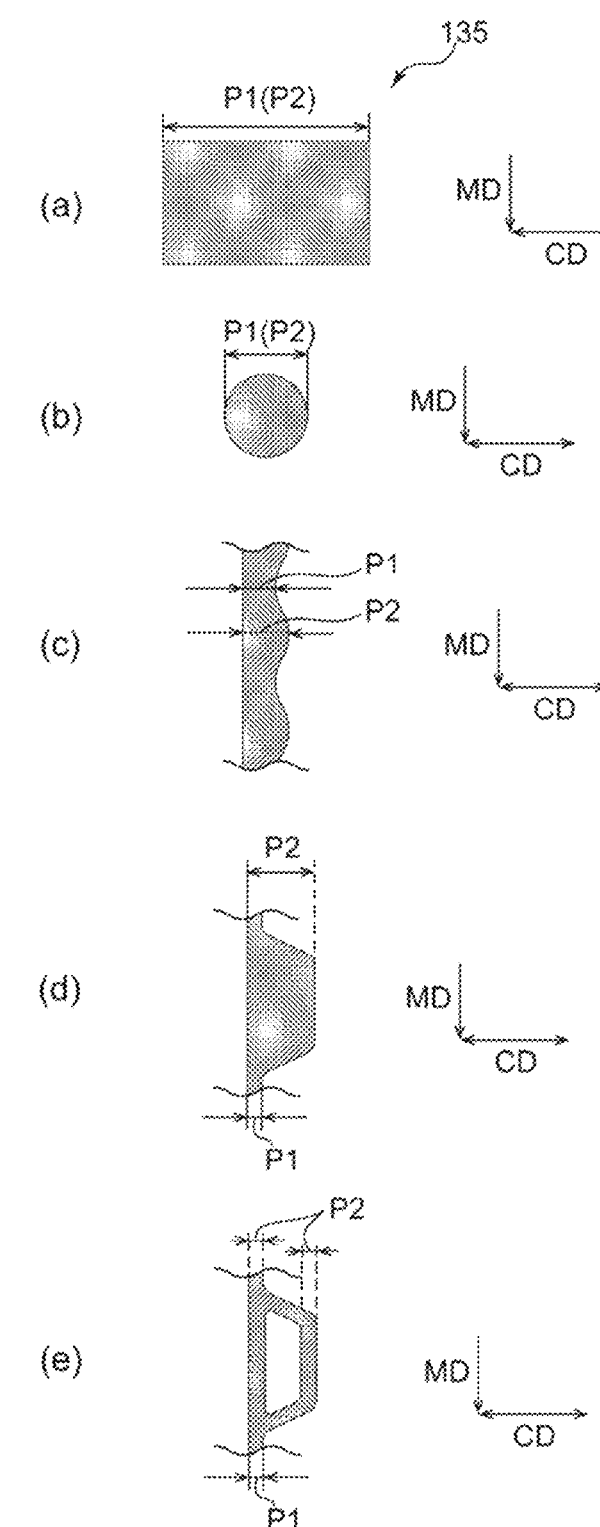

| | Comparative example 1 | Reference example 1 | Reference example 2 | Reference example 3 | Reference example 4 | Reference example 5 | Reference example 6 | Reference example 7 | Reference example 8 |
|---|---|---|---|---|---|---|---|---|---|
| Number of sheet layers | 3 | 3 | 3 | 3 | 3 | 3 | 3 | 3 | 3 |
| Other constituent member — Fiber type — Resin composition | High PET | PP | PP | PP | High PET | PP | High PET | PP | High PET |
| % by mass | 50 | 100 | 100 | 100 | 50 | 100 | 50 | 100 | 50 |
| Fiber type — Resin composition | PE | — | — | — | PE | — | PE | — | PE |
| % by mass | 50 | | | | 50 | | 50 | | 50 |
| First fiber sheet 11 — Basis weight [g/m²] | 30 | 37 | 37 | 37 | 30 | 37 | 30 | 37 | 30 |
| First fiber — Resin composition | PP | High PET | High PET | High PET | High PET | High PET | High PET | High PET | High PET |
| % by mass | 50 | 50 | 50 | 50 | 50 | 50 | 50 | 50 | 50 |
| Second fiber — Resin composition | Ethylene propylene | PE | PE | Low PET | Low PET | Low PET | PE | PE | PE |
| % by mass | 50 | 50 | 50 | 50 | 50 | 50 | 50 | 50 | 50 |
| Second sheet 12 — Basis weight [g/m²] | 80 | 30 | 30 | 70 | 70 | 110 | 80 | 35 | 35 |
| Fiber type — Resin composition | PP | PP | PP | High PET | PP | High PET | PP | High PET | PP |
| % by mass | 100 | 50 | 50 | 50 | 100 | 50 | 100 | 50 | 100 |
| Fiber type — Resin composition | — | Ethylene propylene | Ethylene propylene | PE | — | PE | — | PE | — |
| % by mass | | 50 | 50 | 50 | | 50 | | 50 | |
| Basis weight [g/m²] | 37 | 80 | 80 | 30 | 37 | 30 | 37 | 30 | 37 |
| Forming method of joined portion B | Heat seal | Fixed ultrasonic waves | Rotary ultrasonic waves | Rotary ultrasonic waves | Rotary ultrasonic waves | Rotary ultrasonic waves | Rotary ultrasonic waves | Rotary ultrasonic waves | Rotary ultrasonic waves |
| Formation pattern of joined portion B | FIG. 8 (d) shape | FIG. 8 (d) shape | FIG. 8 (c) shape | FIG. 8 (c) shape | FIG. 8 (c) shape | FIG. 8 (c) shape | FIG. 8 (c) shape | FIG. 8 (c) shape | FIG. 8 (c) shape |
| Linear pressure ratio P2/P1 | 3.93 | 3.93 | 1.79 | 1.79 | 1.79 | 1.79 | 1.79 | 1.79 | 1.79 |
| Presence or absence of embedding of constituent resin of first Fiber sheet | B | C | A | A | A | A | A | A | A |
| Evaluation — Bulkiness restoration rate [%] | 58.5 | — | — | — | — | — | — | — | — |
| Seal strength [N] | 4.8 | 0.0 | 5.2 | 5.5 | 8.1 | 4.9 | 6.8 | 5.2 | 8.7 |
| Feel to touch at contact time (point) | Comparative evaluation examples | — | — | — | — | — | — | — | — |
| Feel to touch in worn state (point) | Comparative evaluation examples | — | — | — | — | — | — | — | — |

TABLE 1-continued

| | | Reference example 9 | Example 1 | Reference example 10 | Reference example 11 | Example 2 | Example 3 | Example 4 | Example 5 |
|---|---|---|---|---|---|---|---|---|---|
| Number of sheet layers | | 2 | 3 | 3 | 3 | 3 | 3 | 3 | 3 |
| Other constituent member | Fiber type — Resin composition | — | High PET | PP | High PET | High PET | High PET | High PET | PP |
| | Resin composition % by mass | — | 50 | 100 | 50 | 50 | 50 | 50 | 100 |
| | Fiber type — Resin composition | — | PE | — | PE | PE | PE | PE | — |
| | Resin composition % by mass | — | 50 | — | 50 | 50 | 50 | 50 | — |
| | Basis weight [g/m²] | — | 30 | 37 | 30 | 30 | 30 | 30 | 37 |
| First fiber sheet 11 | First fiber — Resin composition | High PET | High PET | High PET | High PET | High PET | High PET | High PET | High PET |
| | Resin composition % by mass | 50 | 50 | 50 | 50 | 50 | 50 | 50 | 50 |
| | Second fiber — Resin composition | PE | PE | PE | PE | PE | PE | PE | PE |
| | Resin composition % by mass | 50 | 50 | 100 | 100 | 50 | 50 | 50 | 50 |
| | Basis weight [g/m²] | 30 | 100 | 80 | 80 | 80 | 60 | 60 | 60 |
| Second sheet 12 | Fiber type — Resin composition | PP | PP | High PET | PP | PP | PP | PP | High PET |
| | Resin composition % by mass | 100 | 100 | 50 | 100 | 100 | 100 | 100 | 50 |
| | Fiber type — Resin composition | — | — | PE | — | — | — | — | PE |
| | Resin composition % by mass | — | — | 50 | — | — | — | — | 50 |
| | Basis weight [g/m²] | 37 | 37 | 30 | 37 | 37 | 37 | 37 | 30 |
| Forming method of joined portion B | | Rotary ultrasonic waves | Impulse seal | Rotary ultrasonic waves | Rotary ultrasonic waves | Impulse seal | Impulse seal | Rotary ultrasonic waves | Rotary ultrasonic waves |
| Formation pattern of joined portion B | | FIG. 8 (c) shape | Continuous linear shape | FIG. 8 (c) shape | FIG. 8 (c) shape | Continuous linear shape | Continuous linear shape | FIG. 8 (c) shape | FIG. 8 (c) shape |
| Linear pressure ratio P2/P1 | | 1.79 | 1.00 | 1.79 | 1.78 | 1.00 | 1.00 | 1.79 | 1.79 |
| Presence or absence of embedding of constituent resin of first Fiber sheet | | A | A | A | A | A | A | A | A |
| Evaluation | Bulkiness restoration rate [%] | — | 77.6 | — | — | 64.2 | 69.6 | — | — |
| | Seal strength [N] | 5.6 | — | 5.3 | 5.7 | — | — | 7.9 | 6.6 |
| | Feel to touch at contact time (point) | — | 2.0 | — | — | 6.6 | 8.0 | — | — |
| | Feel to touch in worn state (point) | — | 2.0 | — | — | 6.6 | 10.0 | — | — |

As shown in Table 1, even when the package 1 of the present invention is packaged in the state in which the pressure is applied to the sheet laminate 10, the bulkiness of the sheet laminate 10 is easily restored after opening the bag and the sheet laminate 10 is highly flexible.

Further, as shown in each of the examples and the reference examples, even when the PET fiber is used in the sheet laminate 10, the joining strength of the sheets can be expressed more strongly.

INDUSTRIAL APPLICABILITY

According to the present invention, there is provided the package that has the sheet laminate having sufficient joining strength with the bulkiness easily restored after opening.

The invention claimed is:

1. A package comprising:

a bag; and a sheet laminate packaged in the bag, wherein the sheet laminate includes:

a first fiber sheet including a first fiber including a constituent resin which contains a polyethylene terephthalate resin having a melting point of 230° C. to 300° C., inclusive; and a second sheet including a thermoplastic resin having a melting point of 70° C. to 230° C., inclusive, the sheet laminate includes a joined portion in which the first fiber sheet and the second sheet are joined adjacently to each other, in the joined portion, the thermoplastic resin constituting the second sheet buries gaps among the constituent fibers of the first fiber sheet with the constituent fibers of the first fiber sheet maintaining fiber shapes thereof, and the first fiber sheet, the second sheet, and a heating element including an oxidizable metal are laminated on a site other than a formation site of the joined portion.

2. The package according to claim 1, wherein the thermoplastic resin included in the second sheet comprises one or two or more selected from a polyolefin resin, polyester resin, polyamide resin, vinyl resin, acrylic resin, and a fluororesin.

3. The package according to claim 1, wherein the second sheet is a fiber sheet, in the joined portion, fiber shapes of constituent fibers of the second sheet are not maintained, and in a non-joined portion in which the joined portion is not arranged, fiber shapes of constituent fibers of the second sheet are maintained.

4. The package according to claim 1, wherein in the joined portion, a boundary surface of each of the first fiber sheet and the second sheet does not exist, or the boundary surface is unclear.

5. The package according to claim 1, wherein in the sheet laminate, the first fiber sheet is arranged such that the first fiber sheet forms an outer surface of the sheet laminate.

6. The package according to claim 1, wherein a content ratio of the polyethylene terephthalate resin in the constituent resin included in the first fiber is 50% by mass or more.

7. The package according to claim 1, wherein the constituent resin included in the first fiber consists only of the polyethylene terephthalate resin having the melting point of 230° C. to 300° C., inclusive.

8. The package according to claim 1, further comprising a second fiber as a constituent fiber of the first fiber sheet, wherein the second fiber includes a thermoplastic resin having a melting point of 70° C. to 230° C., inclusive.

9. The package according to claim 1, wherein the first fiber sheet and/or the second sheet is a nonwoven fabric.

10. The package according to claim 1, wherein the bag is made of a resin film.

11. The package according to claim 1, wherein the heating element is between the first fiber sheet and the second sheet, in the site other than the formation site of the joined portion.

12. The package according to claim 1, wherein the sheet laminate is a sanitary product.

\* \* \* \* \*